(12) United States Patent
Yu

(10) Patent No.: US 6,384,713 B1
(45) Date of Patent: May 7, 2002

(54) SERIAL COMPARATOR

(75) Inventor: Daxiao Yu, Mountain View, CA (US)

(73) Assignee: Marvell International, Ltd., Hamilton (BM)

( * ) Notice: Subject to any disclaimer, the term of this patent is extended or adjusted under 35 U.S.C. 154(b) by 0 days.

(21) Appl. No.: 09/556,758

(22) Filed: Apr. 21, 2000

(51) Int. Cl.[7] .................................................. G05B 1/00
(52) U.S. Cl. .......................... 340/146.2; 377/80; 377/81
(58) Field of Search .......................... 340/146.2; 377/80, 377/81

(56) References Cited

U.S. PATENT DOCUMENTS

| | | | |
|---|---|---|---|
| 4,524,345 A | 6/1985 | Sybel et al. ............. | 340/146.2 |
| 4,567,572 A | * 1/1986 | Morris et al. ............ | 340/146.2 |
| 5,266,918 A | 11/1993 | Won et al. ............... | 340/146.2 |
| 5,459,754 A | 10/1995 | Newby et al. ............. | 375/368 |

* cited by examiner

*Primary Examiner*—Margaret R. Wambach
(74) *Attorney, Agent, or Firm*—Eric B. Janofsky

(57) ABSTRACT

In this invention compare circuitry is integrated into a serial shift register which can detect a bit pattern of any length with only the delay of three circuits being added to the shift of the last bit in the bit pattern. The circuitry is connected to operate either is a shift register or as a comparator for an N element bit pattern. Between adjacent registers in the shift register is a MUX used to select compare or shift register operation. An exclusive NOR circuit performs the compare between bits of the serial bit stream and reference bits of the pattern to be protected. An AND circuit accumulates the compare of a particular stage with the compare with the preceding stage. In the last stage the AND circuit provide an accumulated compare result of the preceding number of bit equaling in length the length of the bit pattern for which the compare is being performed.

24 Claims, 4 Drawing Sheets

FIG. 1 - Prior Art

SERIAL COMPARATOR

BACKGROUND OF THE INVENTION

1. Field of Invention

This invention relates the recognition of patterns within digital signals and more particularly patterns within a serial bit stream.

2. Description of Related Art

In circuitry involved in transmitting packets of data such as disk drives and the Internet there is a need to identify patterns prior to starting data. One method used is to shift data into a shift register, and when the shift register is full, connect the data in the registers to a comparator to determine if the desired pattern is present. The time to make the comparison is the amount of time to shift the input data into the shift register plus the time to do the compare. As the number of bits of data to be compared increase this approach becomes less desirable.

In U.S. Pat. No. 5.459.754 (Newby et al.) a recognizer system including transmitting and receiving capability for a serial data stream uses a decision tree to recognize predetermined bit patterns to access a memory to retain previous states of comparison. When the system recognizes a final bit, a logical one is outputted to indicate the sought after pattern has been found. In U.S. Pat. No. 5.266.918 (Won et al.) a serial magnitude comparator is described in which compares input data values with an internal data value. The internal data value may be varied and the output of the comparator is a least significant bit and a most significant bit. In U.S. Pat. No. 4,524,345 (Sybel et al.) a high speed detector is described for detecting a flag character in a serial data stream. A pattern register is used to store a reference flag, pattern. As each bit in the serial data stream is received it is compared to each bit in the reference pattern using a set of comparators simultaneously.

When a pattern many bits long, needs to be detected in a serial bit stream, previous methods Would use an N-stage shift register which is long enough for the pattern needing detection. Once the shift register is filled with bits from the serial bit stream, all of the shift registers would output their bit value in parallel into a comparator circuit. The longer the pattern to be detected, the more stages that are required in the comparator, and the longer the delay before results are known. In today's world of faster and faster communications determining packet identification on the fly requires faster search and find timing to be able to keep up with the communications.

OBJECTS OF THE INVENTION

It is the object of the present invention to overcome the aforementioned problems.

It is another object of the present invention to provide a comparator containing a shift register having minimal internal delays.

It is another object of the present invention to compare bits in a serial bit stream, accomplished within shift register circuitry resulting in only three circuit delays beyond the end of a pattern included within the bit stream, and where a bit in the serial bit stream is compared to all reference bits defining the pattern in parallel.

It is an additional object of the present invention to provide a comparator/shift register with minimal internal delays.

SUMMARY OF THE INVENTION

To accomplish a compare using circuitry within a shift register, the first stage of the comparing shift register compares the first bit in the serial bit stream to the first reference bit. The second stage compares the first bit in the serial bit stream to the second reference bit, and so on until the first bit in the serial bit stream is compared to the last reference bit in the last stage of the comparing shift register. The results in each stage is combined in an AND circuit with the results in the next stage which accumulates the results from stage to stage. The results from the AND circuit in the last stage is a composite of all the compares in all the previous stages. If a compare is not found the next bit in the serial bit stream is compared to all the reference bits, one reference bit for each stage of the comparing shift register. Again the results of the compare are combined with AND circuits in each stage, and the last AND circuit provides the accumulation of the compare results from the last stage and all previous stages. In providing this comparison a total of only three circuits of delay are required beyond the delay of the normal shift register of any length, all exclusive NOR circuit for comparing, an AND circuit for accumulating compare results and a multiplexer (MUX) for choosing compare or at straight shift register.

All stages of the comparing shift register are the same except the first stage which does not have an AND circuit since there is no compare results to accumulate prior to the first stage results. A connection from the output of the output register of the previous stage is connected directly to a first input of a MUX and to a first input of an AND circuit. The AND circuit output is connected to a second input of the MUX. Again the exception is the first stage where the output of the input register is connected directly to the MUX and to an exclusive NOR (XNOR) for comparing a bit of the serial bit stream to the first reference bit. The output of the input register is connected to a first input of the XNOR in each stage of the comparing shift register so that each bit of the serial bit stream is compared to each reference bit. The reference bit to which the bits in the serial bit stream are compared is connected to the second input of the XNOR. The reference bit can be different for each comparator in the comparing shift register. The MUX in each stage is selected for shifting or for comparing, and a clock signal, CLK, opens the register so data from the previous stage can be clocked into the register.

In the compare/shift register of the present invention, an input register is clocked which connects a bit from a serial bit stream to the first stage of the comparator/shift register. In the first stage a bit in a serial bit stream is connected to a first input of a MUX and to a first input to an XNOR circuit. The bit from the serial bit stream is also connected to the first input of XNOR circuits in all subsequent stages of the comparator/shift register. The second input of the XNOR circuit in the first stage is connected to a first reference bit. The second input of an XNOR circuit in the second stage is connected to a second reference bit. In the third stage the second input to an XNOR circuit is connected to a third reference bit, and continuing in like manner until the last stage where the last reference bit is connected to the second input of an XNOR circuit in the last stage. The output of the XNOR circuit in the first stage is connected to the second input of the MUX. The MUX is controlled with a select signal that chooses the output of the XNOR for use in a compare configuration, or the serial hit stream for use as a shift register. The output of the MUX is connected to the input of the first stage output register. When a clock signal is applied to the register, the signal from the MUX is captured by the register and passed on to the second state.

In the second stage the output of the first stage register connects bits from the serial bit stream to a first input of an AND circuit and to a first input of a MUX. The output of the second stage XNOR circuit is connected to the second input of the AND circuit. The output of the AND circuit is connected to the second input of the MUX. A select signal selects either the serial bit stream to connect to the input of the second stage output register or the output of the AND circuit. When the circuitry is being used as a shift register the MUX select signal selects the serial bit stream, and when the circuitry is being used as a compare circuit the output of the AND circuit is connected to the second stage output register.

When being used as a compare circuit, the compare signal from the first stage is connected to the first input of the second stage AND circuit. The second stage compare signal is connected front the Output of the second stage XNOR circuit to the second input of the AND circuit. When a bit comparison is made in the first stage and in the second stage, the AND circuit produces a signal signifying that there was a comparison in both stages to the respective reference bits. If either the first stage or the second stage does not produce a comparison between bits in the serial bit stream, the AND circuit output produces a no compare signal which is connected to the second stage MUX. The output of the second stage MUX is connected to output register of the second stage. When a clock signal is applied to the second stage register the results of the AND of the first stage results and the second stage results are connected to the third stage. The ANDing of the first stage compare results with the second stage compare results are an accumulation of the compare results from the first stage and the second stage.

The accumulation of the compare results from the first two stages is connected to the third stage through the clocking of the second stage output register. In like manner to the second stage, the third stage compare results is accumulated in the third stage AND circuit with the accumulated results of the previous two stages. The output of the third stage becomes the accumulation of the compare of the first, second and third stages. The accumulation of compare results continues in like manner in subsequent stages until the nth and last stage produces a total compare results for n contiguous bits in the serial bit stream.

The first bit in a serial bit stream is connected to the XNOR compare circuit in the first stage and all the subsequent stages of the comparator from the second stage through the nth and last stage. If the first bit compares to a first predetermined value in the first stage, the same first bit may or may not indicate a comparison in the next n–1 bits. When there is not a comparison in the n stages of the compare circuitry, the non-comparison will accumulate in subsequent stages with subsequent bits to produce a no comparison at the output of the last stage for the last n bit in the serial bit stream.

The second bit in the serial bit stream is connected to all the compare circuit in all stages of the comparator from the first stage to the nth and last stage. When the second hit produces a comparison to the second predetermined reference value in the second stage compare circuit, the compare results is accumulated by ANDing the second stage compare results from the first stage results for the first bit. If the first bit compares with the first predetermined value and the second bit compares with the second predetermined value, the accumulated results through two stages is a compare. While this is going on, the first stage is comparing the second bit in the serial bit stream with the first predetermined reference value, and all subsequent stages to the second stage are comparing the second bit to the predetermined reference values connected to each of the subsequent stages The compare results in the first stage to the second bit in the serial hit stream will be clocked into the second stage as the compare accumulation results of the second stage are clocked into the third stage.

The second bit in the serial bit stream is connected to all of the compare XNOR circuits in the n stages of the compare circuitry. If the third bit does not compare to the third predetermined reference value in the XNOR compare circuit in the third stage then the ANDing of the third compare results with the accumulation of the comparison of first two bits will indicate a no comparison for the first three bit is the serial bit stream. If the third bit compares to the third predetermined value, then the accumulated compare results of the third stage will indicate a comparison for the first three bits in the serial bit stream. This comparison of the input data stream continues by exclusive NORing the input data stream with the predetermined reference values in each of the compare stages. When the last stage outputs an accumulated compare signal from its AND circuit, then all compare stages found a comparison between their predetermined reference value and a bit in the serial bit stream, and the last n bits of the serial bit stream is a match to the n predetermined values.

BRIEF DESCRIPTION OF THE DRAWINGS

This invention will be described with reference to the accompanying drawings, wherein.

DETAILED DESCRIPTION OF THE PREFERRED EMBODIMENT

Figure 1:
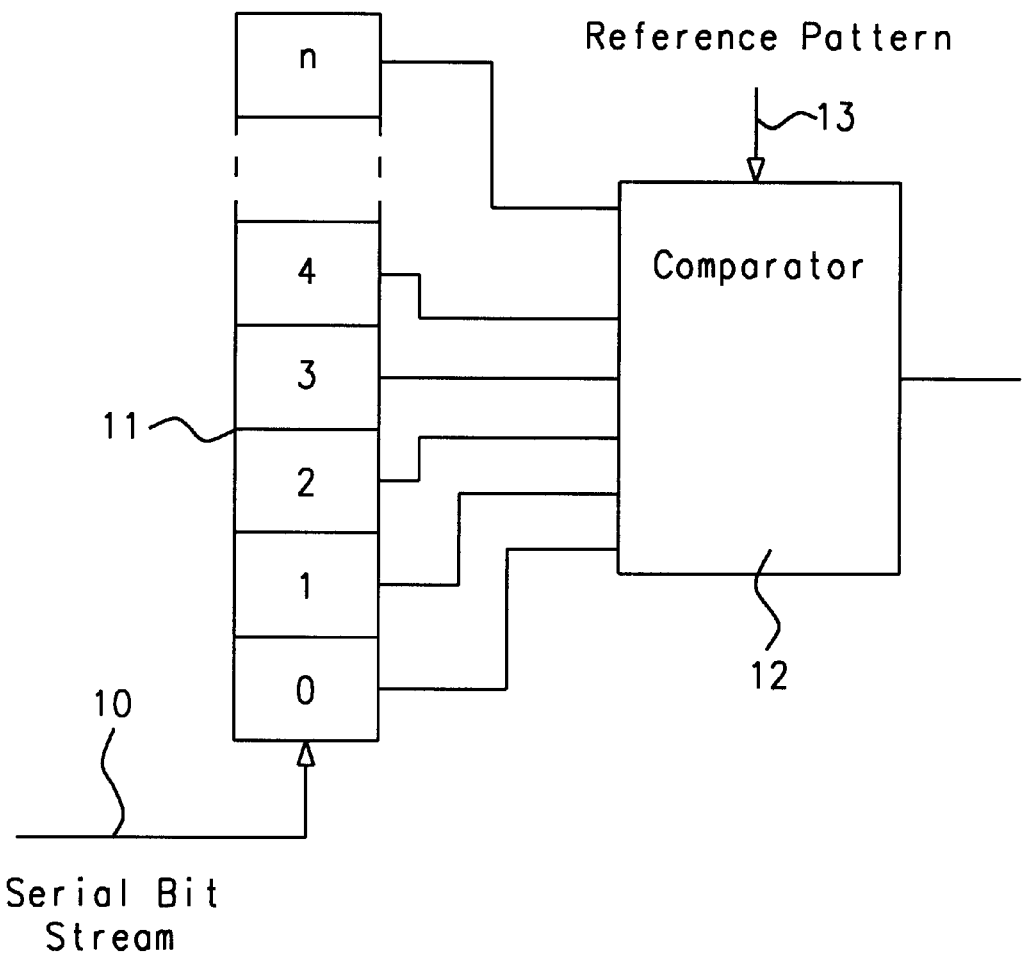
FIG. 1 is a block diagram of prior art.

Shown in FIG. 1 is a block diagram for detecting a bit pattern in a serial bit stream of prior art. In this prior art scheme 10 is connected to an "n" stage shift register 11. Once the shift register is full, containing bits from 0 to n, the values in each register of the shift register 11 are outputted to a comparator 12. The comparator compares the bits from the serial bit stream by way of the shift register 11 to a reference pattern 13. Depending on the length of the bit pattern, the comparator could be several circuit stages deep adding and delay to the process of determining the bit pattern within the serial bit stream.

Figure 2:
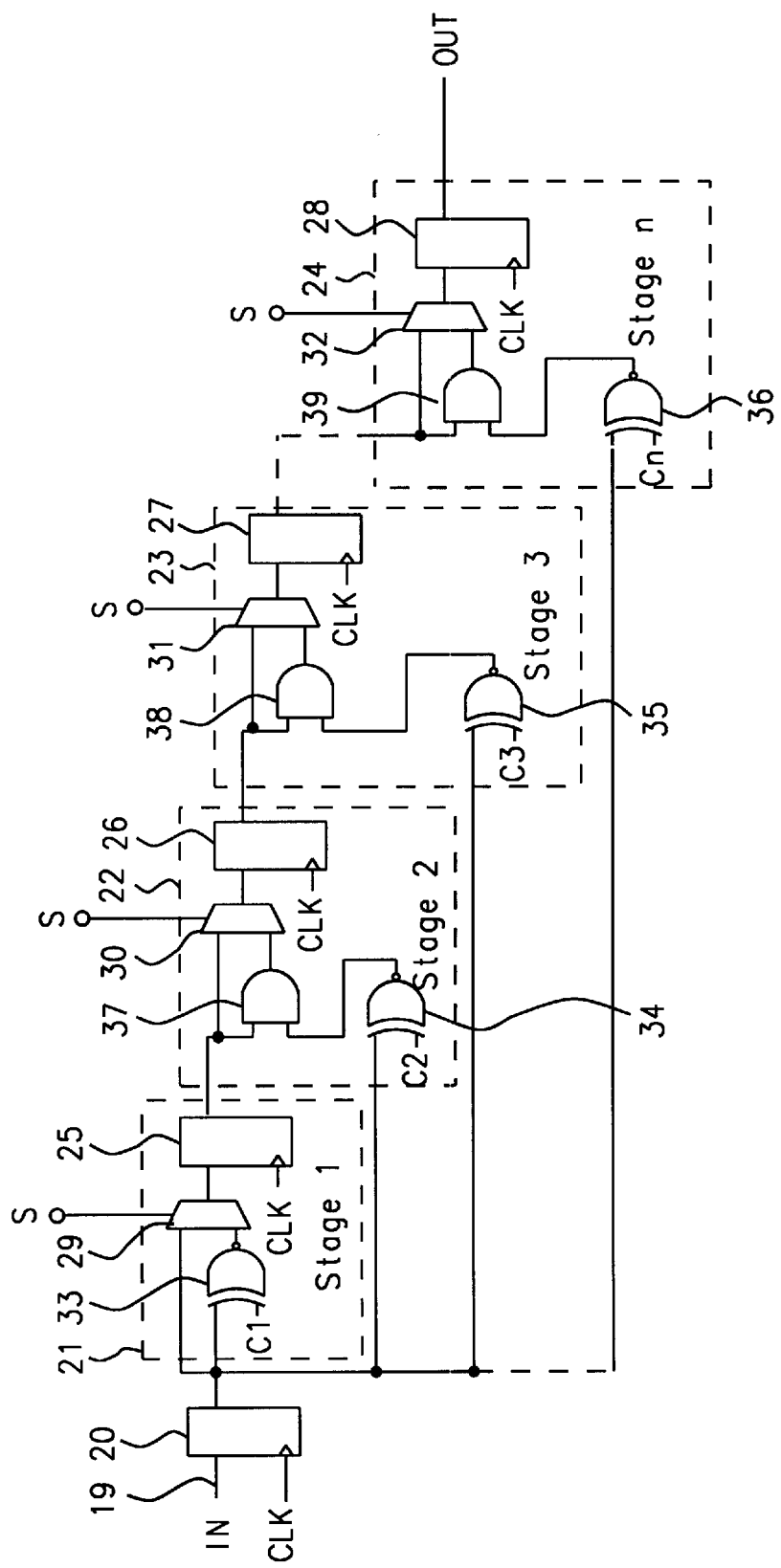
FIG. 2 is a schematic diagram of a comparator/shift register in accordance with a first embodiment of the present invention.

In FIG. 2 is shown a circuit diagram of this invention where the compare circuits necessary to detect a bit pattern within a serial bit stream are integrated into a shift register. A serial bit stream is connected to the input 19 of the input register 20. A clock signal CLK allows a bit from the serial bit stream to be stored into register 20 and to circuitry connected to the output of the register 20. All registers in the compare circuitry are clocked by CLK. The output of the input register 20 connects to a first stage 21 of a combined compare circuit and shift register. The output of the first stage 21 connects to a second stage 22, and the output of the second stage 22 connects to a third stage 23. This interconnection of stages continues in similar fashion to an nth and last stage 24. In each of the stages 21, 22, 23 and 24 the output of the previous register 20, 25, 26 and 27 is connected directly to multiplexers (MUX) 29, 30, 31 and 32, respectively. The out put of the input register 20 is also connected to exclusive NOR circuits 33, 34, 35 and 36 in Stage 1. Stage 2, Stage 3, respectively, and continuing to connect to all exclusive NOR circuits in subsequent stages through to Stage n. The exclusive NOR circuit 33 is used to compare a bit in the serial bit stream to a first reference bit C1. The exclusive NOR circuit 33 is connected to an input of the MUX 29. If the circuitry is used as a shift register the signal S selects the MUX 29 to connect the input register 20 to the output register 25 of stage 1. When the circuitry is used to detect a pattern of bits within a serial bit stream the signal S selects the MUX 29 to connect the output of the exclusive NOR 33 to the output register 25 of stage 1.

Continuing to refer to FIG. 2, in the second stage 22 the output of the previous register 25 is connected directly to a MUX 30 and to all AND circuit 37. The exclusive NOR circuit 34, used to compare a bit in the serial bit stream to a second reference bit C2, is connected to an input of the AND circuit 37. This allows the compare results in stage 1 and the compare results in stage 2 to he accumulated. The results are accumulated such that the output of the AND circuit 37 will show that both compare circuits 33 34 found consecutive bits in the serial bit stream that were the same as reference bit C1 followed by C2, or that either one compare circuit or both compare circuits did not find a comparison to their respective reference bits. If the circuitry is used as a shift register the signal S selects the MUX 30 to connect the previous stage register 25 to the output register 26 of stage 2. When the circuitry is used to detect a pattern of bits within a serial bit stream the signal S selects the AND circuit 37 to connect the combined results of the exclusive NOR 33 and the exclusive NOR 34 to the output register 26 of stage 2.

Continuing to refer to FIG. 2, in the third stage 23 the output of the previous register 26 is connected directly to a MUX 31 and to an AND circuit 38. The exclusive NOR circuit 35, used to compare a bit in the serial bit stream to a third reference bit C3, is connected to an input of the AND circuit 38. This allows the compare in stage 1, the compare in stage 2 and the compare in stage 3 to be accumulated such that the output of the AND circuit 38 will show that all three compare circuits 33, 34, and 35 found three consecutive bits in the serial bit stream the were the same as reference bit C1 followed by C2 followed by C3, or that any one of the three or all did not find a compare. If the circuitry is used as a shift register the signal S selects the MUX 31 to connect the previous stage register 26 to the output register 27 of stage 3. When the circuitry is used to detect a pattern of bits within a serial bit stream, the signal 3 selects the AND circuit 38 to connect the combined compare of the exclusive NOR 33, the exclusive NOR 34 and the exclusive NOR 15 to the output resister 96 of stage 3.

Continuing to refer to FIG. 2, in the nth stage 24 the output of the previous register 27 is connected directly to a MUX 32 and to an AND circuit 39. The exclusive NOR circuit 36, used to compare a bit in the serial bit stream to an nth reference bit Cn, is connected to an input of the AND circuit 39. This allows the compare in stage 1, the compare in stage 2, the compare in stage 3 and the compares in all the remaining stages up to and including stage n to be accumulated such that the output of the AND circuit 39 will show that all compare circuits 33, 34, 35 up to and including 36 all found consecutive bits in the serial bit stream the were the same as reference bit C1 followed by C2 followed by C3 and followed by a reference bits up to and including Cn, or that any one of the compare circuits, or all did not find a compare. If the circuitry is used as a shift register the signal S selects the MUX to connect the previous stage register 27 to the output register 238 of stage n. When the circuitry is used to detect a pattern of bits within a serial bit stream the signal Sn selects the AND circuit 39 to connect the combined compare of the exclusive NOR 33, the exclusive NOR 34, the exclusive NOR 35 and all exclusive NOR circuits up to and including exclusive NOR 36 to the output register 28 of stage n providing a total accumulative result. As will be appreciated by one skilled in the art, in each of stages 2 through n there are three delay elements, namely exclusive NOR circuit XNOR 34, 35, and 36; AND gate 37, 38 and 39; and multiplexer MUX 30, 31, and 32.

Figure 3:
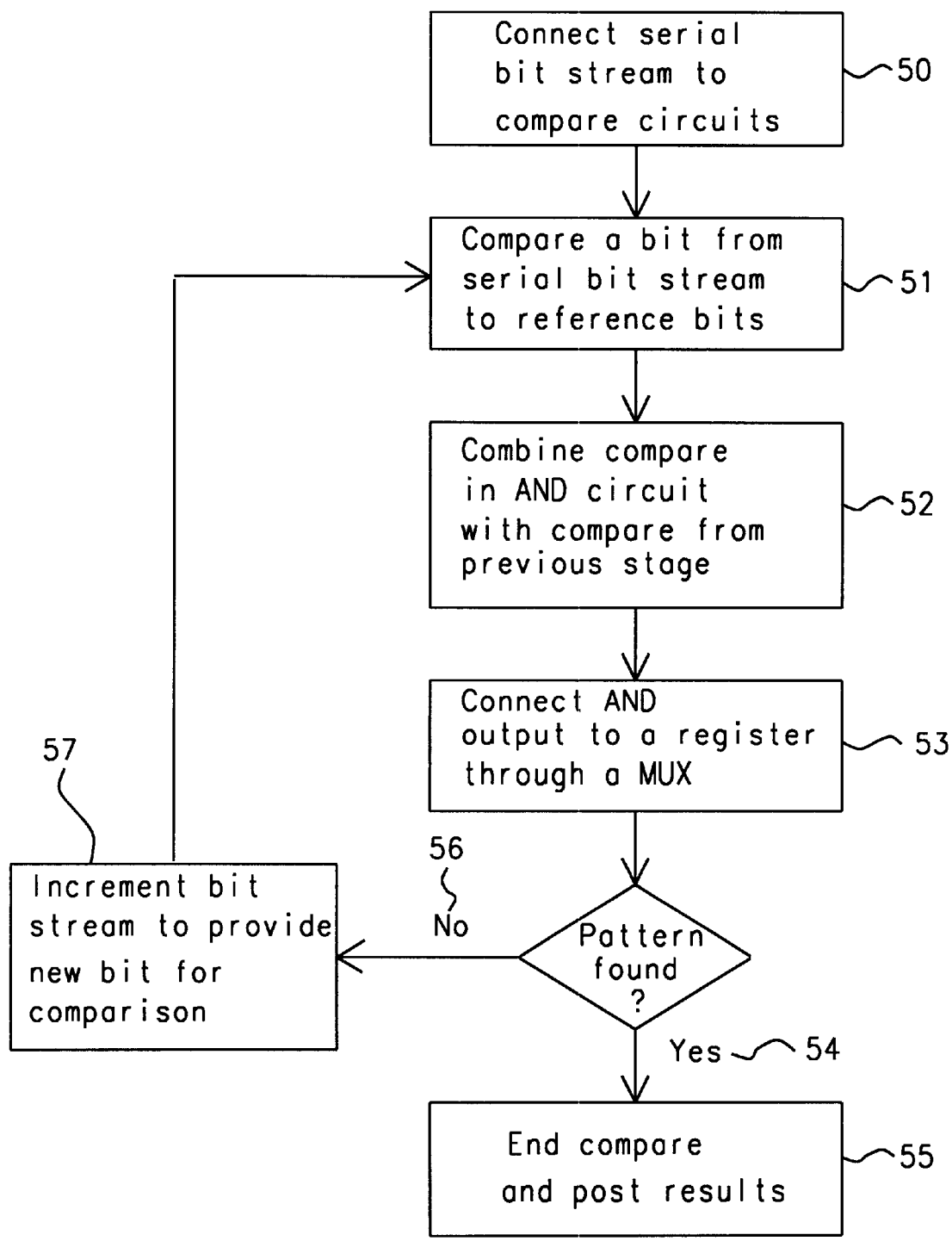
FIG. 3 is flow diagram of the process of this invention for detecting a pattern in a serial hit stream.

In FIG. 3 is shown a flow diagram of the process of comparing bits in a serial bit stream in order to detect a particular pattern of consecutive sequence of bits. A serial bit stream is connected to the input register of the compare circuitry 50. A bit from the serial bit stream is distributed to all compare circuits to be compared with each reference bit 51. AND circuits in each stage after the first stage accumulates compare results from previous stages 52. The AND circuit in each stage is connected to the output register of the stage through the MUX in the stage 53. When a compare is not being done, the MUX can switched to cause the circuitry to be used as a shift register by bypassing the compare and AND circuits. If the output of the compare circuitry shows a pattern of consecutive bits in the serial hit stream matching the reference bits 54, then the compare process is completed and the result of the compare is outputted from the output register of the last stage 55. If a pattern has not been found 56, the next bit from the serial bit stream is connected to the input of the compare circuitry 57 and the process returns to step 2 where the next bit is compared to all the reference bits 51.

Figure 4:
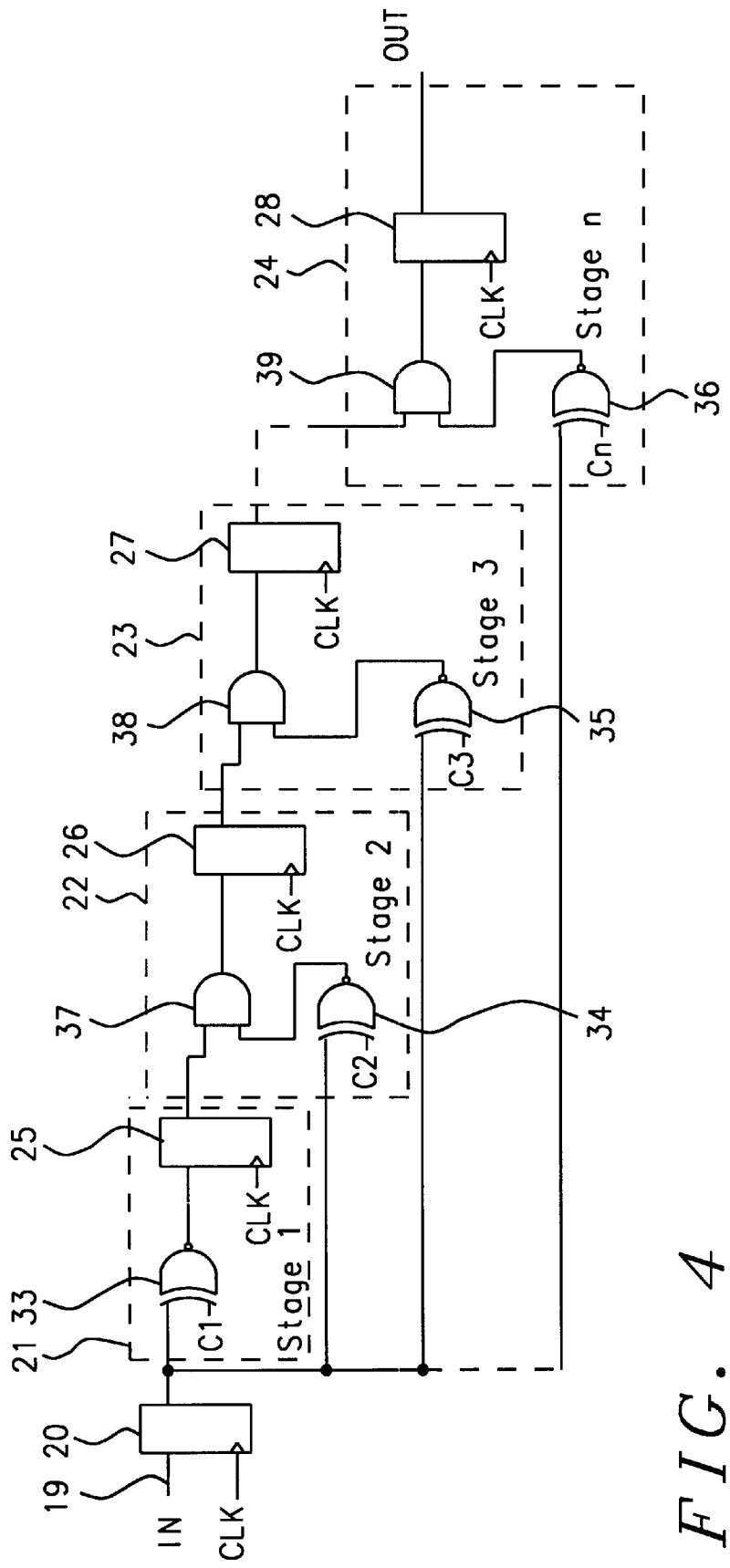
FIG. 4 is a schematic diagram of a comparator in accordance with an alternative embodiment of the present invention.

FIG. 4 is a schematic diagram of a comparator in accordance with an alternative embodiment. In the alternative embodiment only a comparator is implemented, similar to the first embodiment, but no shift register capability is provided. The operation of the comparator portion is similar to that of the first embodiment and no other explanation is provided.

While the invention has been particularly shown and described with reference to preferred embodiments thereof, it will be understood by those skilled in the art that various changes in form and details may be made without departing from the spirit and scope of the invention.

What is claimed is:

1. A selectable serial comparator/shift register, in response to a selection signal, shifts serial input data or compares the serial input data with a first predetermined value and a second predetermined value, said comparator comprising:

a) a first stage, in response to the selection signal, to selectively compare at first portion of the input serial data with the first predetermined value, or shift the input serial data: and b) a second stage to receive a result from the first stage and, in response to the selection signal, to selectively, compare a second portion of the input serial data with the second predetermined value and to provide a comparison result of the serial data with the first and second predetermined values, or shift the input serial data.

2. A selectable serial comparator/shift register according to claim 1, further comprising N stages arranged in a serial manner, in response to the selection signal, selectively shift the input serial data or compare the serial input data with N predetermined values, wherein N is a positive integer greater than two.

3. A selectable serial comparator/shift register according to claim 1, wherein said first stage comprises a first logic unit to receive the input serial data and the first predetermined value, a first selector responsive to the selection signal and a first register to receive an output of said first logic unit or the input serial data in accordance with said first selector.

4. A selectable serial comparator/shift register according to claim 3, wherein said first logic unit comprises a first exclusive NOR logic circuit.

5. A selectable serial comparator/shift register according to claim 1, wherein said second stage comprises a second logic unit to receive the serial data, the second predetermined value and the result from said first stage, a second selector responsive to the selection signal, and a second register to receive an output of said second logic unit or the result from said first stage in accordance with said second selector.

6. A selectable serial comparator/shift register according to claim 5, wherein said second logic unit comprises a second exclusive NOR logic circuit to receive the serial data and the second predetermined value, and an AND logic circuit to receive an output of said second exclusive NOR logic circuit and the said first stage.

7. A selectable serial comparator/shift register according to claim 4, wherein said second stage comprises a second logic unit to receive the serial data, the second predetermined value and the result from said first stage, a second selector responsive to the selection signal, and a second register to receive an output of said second logic unit or the result from said first stage in accordance with said second selector.

8. A selectable serial comparator/shift register according to claim 7, wherein said second logic unit comprises a second exclusive NOR logic circuit to receive the serial data and the second predetermined value, and an AND logic circuit to receive an output of said second exclusive NOR logic circuit and the output of said first register.

9. A selectable serial comparing/shift register means, in response to a selection signal, shifts serial input data or compares the serial input data with a first predetermined value and a second predetermined value, said comparing means comprising:
   a) a first circuit means, in response to the selection signal, for selectively comparing a first portion of the input serial data with the first predetermined value, or shifting the input serial data; and
   b) a second circuit means for receiving a result from the first circuit means and, in response to the selection signal, for selectively comparing a second portion of the input serial data with the second predetermined value and to provide a comparison result of the serial data with the first and second predetermined values, or shifting the input serial data.

10. A selectable serial comparator/shifting register according to claim 9, further comprising N circuit means arranged in a serial manner in response to the selection signal for selectively shifting the input serial data or comparing the serial input data with N predetermined values, wherein N is a positive integer greater than two.

11. A selectable serial comparator/shift register according to claim 9, wherein said first circuit means comprises a first logic means for receiving the input serial data and the first predetermined value, a first selector means responsive to the selection signal and a first register means for storing an output of said first logic means or the input serial data in accordance with said first selector means.

12. A selectable serial comparator/shift register according to claim 11, wherein said first logic means comprises a first exclusive NOR means.

13. A selectable serial comparator/shift register according to claim 9, wherein said second circuit means comprises a second logic means for receiving the serial data, the second predetermined value and the result from said first circuit means, a second selector means responsive to the selection signal, and a second register means for storing an output of said second logic means or the result from said first circuit means in accordance with said second selector means.

14. A selectable serial comparator/shift register according to claim 13, wherein said second logic means comprises a second exclusive NOR means for logically exclusively NORing the serial data and the second predetermined value, and an AND means for logically ANDing an output of said second exclusive NOR means and the said first circuit means.

15. A selectable serial comparator/shift register according to claim 12, wherein said second circuit means comprises a second logic means for receiving the serial data, the second predetermined value and the result from said first circuit means, a second selector means responsive to the selection signal, and a second register means for storing an output of said second logic means or the result from said first circuit means in accordance with said second selector.

16. A selectable serial comparator/shift register according to claim 15, wherein said second logic means comprises a second exclusive NOR means for logically exclusively NORing the serial data and the second predetermined value, and an AND means for logically ANDing an output of said second exclusive NOR means and the output of said first register means.

17. A method, in response to a selection signal, of shifting serial input data or of comparing the serial input data with a first predetermined value and a second predetermined value, said method comprising the steps of:
   a) selectively, in response to the selection signal,
      a1) comparing a first portion of the input serial data with the first predetermined value, or
      a2) shifting the input serial data; and
   b) selectively, response to the selection signal,
      b1) comparing a second portion of the input serial data with the second predetermined value and to provide a comparison result of the serial data with the first and second predetermined values, or
      b2) shifting the input serial data.

18. A method according to claim 17, further comprising the steps of repeating step (b) N times with N predetermined values, wherein N is a positive integer greater than two.

19. A method according to claim 17, wherein step (a) further comprises the steps of:
   c) performing logical operations on the input serial data and the first predetermined value,
   d) storing an output of step (c) or the input serial data in accordance with the selection signal.

20. A method according to claim 19, wherein step (c) comprises the step of logically exclusively NORing the input data and the first predetermined data.

21. A method according to claim 17, wherein step (b) comprises the steps of:
   c) performing logical operations on the serial data, the second predetermined value and the result from step (a),
   d) storing an output of said step (c) or the result from step (a) in accordance with sail selection signal.

22. A method according to claim 21, wherein step (c) comprises the steps of:
   e) logically exclusively NORing the serial data and the second predetermined value, and f) logically ANDing all output of step (e) and the result of step (a).

23. A method according to claim 20, wherein step (b) comprises the steps of:
   g) performing logical operations on the serial data, the second predetermined value and the result from said step (d)
   h) storing an output of step (g) or the result from step (d) in accordance with the selection signal.

24. A method according to claim 23, wherein step (g) comprises the steps of:
   i) logically exclusively NORing the serial data and the second predetermined value, and
   j) logically ANDing an output of step (i) and the output of step (d).

* * * * *